United States Patent Office 3,340,145
Patented Sept. 5, 1967

3,340,145
CARBANILIDE COMPOSITIONS AND METHODS OF USING SAME
Henry Martin, Basel, Paul Schmidt, Therwil, and Max Wilhelm, Allschwil, Switzerland, assignors to Ciba Corporation, New York, N.Y., a corporation of Delaware
No Drawing. Filed Jan. 19, 1965, Ser. No. 426,679
Claims priority, application Switzerland, Apr. 21, 1961, 4,682/61
15 Claims. (Cl. 167—53)

This is a continuation-in-part application of our application Ser. No. 188,520, filed Apr. 18, 1962, now abandoned.

The present invention relates to feedstuffs and feedstuff additives containing a carbanilide of the formula

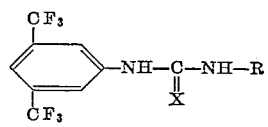

(I)

in which R represents a substituted or unsubstituted aromatic radical and X stands for O or S, or to the use of such a carbanilide for the preparation of feedstuffs and feedstuff additives or as an additive to homegrown animal feeds; also veterinary compositions containing a carbanilide of the above kind, and processes for the preparation of all these compositions.

It is known that domestic animals, such as ruminants, for example, cattle, sheep or goats, horses, pigs, dogs, cats, furred animals, rabbits, poultry, such as chickens, turkeys, ducks, geese and birds in cages, particularly young animals, are exposed to a great number of environmental factors which, in certain cases, can cause an undesirable retardation in growth in spite of a considerably increased food intake. In addition, the average rate of growth or breeding results are diminished by infections or infestations and the losses these entail.

Recently it has been shown that antibiotics, such as tetracyclin, chlorotetracyclin, oxytetracyclin, erythromycin and procaine-penicillin, and chemotherapeutic agents, such as sulfaquinoxaline, can bring about a more rapid growth and greater increase in weight in domestic animals. The mechanism responsible for this unusual physiological effect consists very probably in a diminished susceptibility to disease by inhibition of the pathogens and by influencing the bacterial flora in the animal's environment or in the animal itself. In a few cases in which the organisms responsible for disturbing growth conditions are not influenced by antibiotics with too small a therapeutic range, a specific therapeutic may also produce an analogous effect. For example, in cases of coccidiosis growth was considerably promoted in poultry by administration of small quantities of dialkyl-dithiocarbamates, dinitro-diphenyl-disulfides, nicarbazin, nitrofurazone and similar chemotherapeutics. Another means of influencing the growth of domestic animals is in the use of certain types of hormoneactive agents, such as stilboestrol. The good results are probably due to anabolic activity or protein metabolism by changes in fat metabolism and suppression of normal androgenic function.

It has been found that by using a carbanilide of the above formula when feeding domestic animals, such as ruminants, for example, cattle, sheep or goats, horses, pigs, dogs, cats, furred animals, rabbits, poultry, such as chickens, turkeys, ducks, geese and birds in cages, the average growth and an increase in weight or general well-being are promoted and especially damage caused by vermiculea can be prevented or considerably weakened. The new feedstuffs or feedstuff additives have a particularly good effect in furred animals, dogs, cats, birds in cages, ruminants and horses which are frequently infested by tape-worms, such, for example, as Taenia, Mesocestoide, Diphyllobothrium, Dipylidium in the dog, cat and furred animals, and Davainea and Raillietina in birds in cages, Moniezia in ruminants and Anoplocephala in the horse.

The invention also includes veterinary compositions which contain a carbanilide of the defined type together with a carrier. These compositions have a good effect in the intestines of animals, especially those mentioned above, against the aforementioned tapeworms, and can therefore be used with advantage in veterinary medicine.

Carbanilides which are advantageously used in the aforementioned compositions or are particularly useful for the purposes indicated are those of the general Formula I in which R stands for a substituted or unsubstituted phenyl radical and X for O or S, the compounds of the general formula

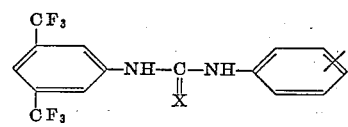

(II)

in which R represents an alkyl or alkoxy radical, such as a lower alkyl or lower alkoxy radical, an F, Cl, Br or I atom, the group —$CF_3$, —$NO_2$, —CN, —$SO_3H$, —$SO_2NH_2$, —$SO_2CH_3$, —OH, —SCN, —$SO_2NHA$,

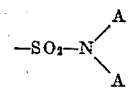

—COOH, —$COCH_3$, —COOA, —$CONH_2$, —CONHA or —$CONA_2$, A standing for an alkyl radical, preferably a lower alkyl radical, $n$ is a whole number from 1 to 4, and X represents O or S, deserving special mention.

Particularly valuable is 3:5-bis-trifluoromethyl-4'-nitrocarbanilide and the corresponding thiocarbanilide of the formula

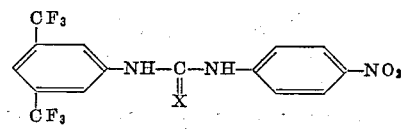

wherein X stands for O or S.

As further examples of the compounds of the general Formula I there may be mentioned: carbanilides of the general formula

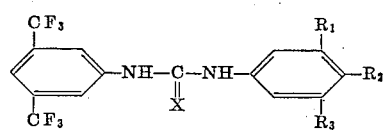

in which $R_1$, $R_2$ and $R_3$ are identical or different and represent an alkyl or alkoxy radical, an F, Cl, Br or I atom, the group —$CF_3$, —$NO_2$, —CN, —$SO_3H$, —$SO_2NH_2$, —$SO_2CH_3$, —$SO_2NHA$, —OH, —SCN,

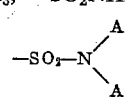

—COOH, —COOA, —$CONH_2$, —CONHA or —$CONA_2$, A standing for a lower alkyl radical and X for O or S; carbanilides of the general formula

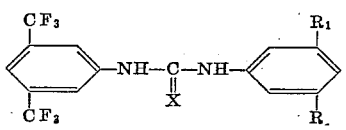

in which $R_1$, $R_2$ and $X$ have the meanings given above; carbanilides of the general formula

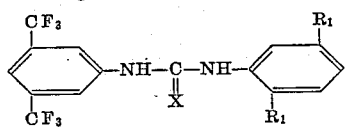

in which $R_1$, $R_2$ and $X$ have the meanings given above; carbanilides of the general formula

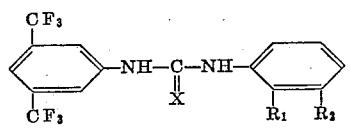

in which $R_1$, $R_2$ and $X$ have the meanings given above; carbanilides of the general formula

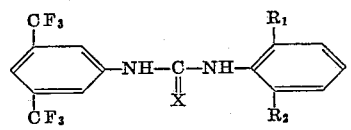

in which $R_1$, $R_2$ and $X$ have the meanings given above; carbanilides of the general formula

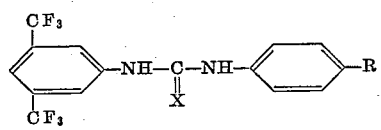

in which R represents an alkyl or alkoxy radical, an F, Cl, Br or I atom, the group —$CF_3$, —CN, —SCN, —$SO_3H$, —$SO_2NH_2$, —$SO_2CH_3$, —$COCH_3$, —$SO_2NHA$,

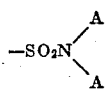

—COOH, —COOA, —$CONH_2$, —CONHA or —$CONA_2$, A standing for a lower alkyl radical and X for O or S; carbanilides of the general formula

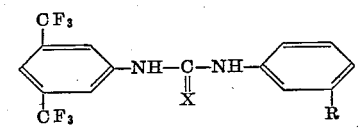

in which R and X have the meanings given above, for example the compounds of the formulae (a) 
$$\text{CF}_3\text{-C}_6\text{H}_3(\text{CF}_3)\text{-NH-CS-NH-C}_6\text{H}_4\text{-Br}$$

(b) 
$$\text{CF}_3\text{-C}_6\text{H}_3(\text{CF}_3)\text{-NH-CS-NH-C}_6\text{H}_4\text{-Cl}$$

(c) 
$$\text{CF}_3\text{-C}_6\text{H}_3(\text{CF}_3)\text{-NH-C(=O)-NH-C}_6\text{H}_3\text{-Cl}_2$$

(d) 
$$\text{CF}_3\text{-C}_6\text{H}_3(\text{CF}_3)\text{-NH-CO-NH-C}_6\text{H}_3(\text{CF}_3)\text{-Cl}$$

(e) 
$$\text{CF}_3\text{-C}_6\text{H}_3(\text{CF}_3)\text{-NH=CS-NH-C}_6\text{H}_3(\text{CF}_3)$$

(f) 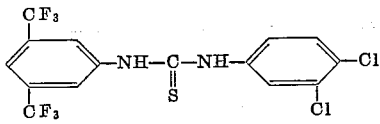

The composition of the feedstuffs or feedstuff additives to which the above described compounds are added depends on the kind of animal to be feed, its age, the ruling market price of the feedstuff concerned and other factors. Generally speaking, mixed feedstuffs, which contain hydrocarbons, proteins, fats, minerals and vitamins, are very advantageous. Suitable feed components are, for example, corn, milled products, such as flour, groats, shorts of rye, wheat, barley, oats, buckwheat, maize, sorghum or millet; grass, clover, lucerne flour, molasses, meat scrap, fish, soya and groundnutcake flour, liver oil, lime-powder and bone-meal, thiamine, riboflavin, ascorbic acid or vitamin $B_{12}$ or similar feedstuff, mineral or vitamin additives. The new compounds may also be given as a solution or dispersion in drinking water or skimmed milk, if desired in the presence of a suitable dispersant.

The feedstuffs and feedstuff additives of the invention may contain in addition to the above-mentioned carbanilides other valuable substances, for example antibiotics with a wide therapeutic range, such as tetracyclin or chlorotetracyclin, hormones or other compounds having a hormone effect, such as diethylstilboestrol or hexoestrol, or other factors stimulating growth, for example alkaloids obtainable from plants of the Apcoyneae family, such as reserpine, rescinnamine, deserpidine or raunescine or the mother liquors or oleoresins containing these alkaloids.

In order to obtain the effect desired the carbanilide content of the feedstuff, which may also be attained by the addition of a feedstuff additive with a correspondingly higher carbanilide content (e.g. 5 to 95%), is advantageously between about 0.1 to 0.001%, depending on whether a short (higher doses) or protracted administration is intended. The daily intake of carbanilide may lie, for example between 20 mg./kg. and 100 mg./kg. bodyweight.

The veterinary compositions contain advantageously, for example 50 to 2000 mg. per dosage unit, depending on the kind of animal. The daily dose is on an average between 30 and 100 mg./kg. bodyweight, the treatment being carried out for several days, for example on three consecutive days. As carriers, the usual excipients may be used, for example water, gelatin, lactose, starch, magnesium stearate, talc, vegetable oils, benzyl alcohols, gums, polyalkyleneglycols, cholesterol or any other known medicinal excipient. The compositions may be, for example in the form of tablets, capsules, dragees, powders, suppositories or in liquid form as solutions, for example, as suspensions or emulsions. They may be sterilized and/or contain auxiliaries, such as preserving, stabilizing, wetting or emulsifying agents, taste, odor or color corrigents. They may also contain other medicinally useful substances. In particular, by the addition of a laxative (for example paraffin oil, castor oil) the excretion of the worms killed or damaged by the effect of the composition may be accelerated.

The carbanilides used according to the invention may be prepared by a process known per se. The compounds may be obtained, for example, in a general way by reacting the starting materials of the general formula

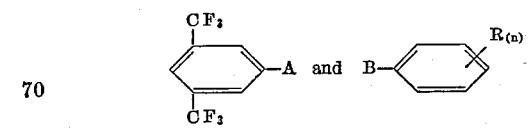

together, the symbols A and B being so chosen each time that they react together with the formation of a urea or thiourea bridge, and R and $n$ having the meaning given for the general Formula II. For example, a compound of the general formula

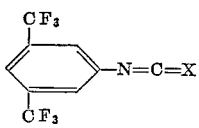

in which X represents O or S is reacted with a compound of the general formula

in which R represents a substituted or unsubstituted aromatic radical, or a compound of the general formula

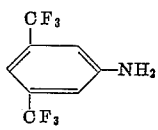

is reacted with a compound of the general formula

R—N=C=X in which R and X have the meanings given above.

Thus, in the preparation of the compounds of the invention 3:5-trifluoromethylphenyl isocyanate is reacted, for example, with the following compounds: aniline or substituted anilines for example para-chloraniline,
3:4-dichloraniline,
3:5-dichloraniline,
2:5-dichloraniline,
3:4:5-trichloraniline,
2:4:5-trichloraniline,
3-chloro-4-bromaniline,
3-chlor-4-methoxy-aniline,
3-chloro-4-methylaniline,
3-trifluoromethylaniline,
2-chloro-5-trifluoromethylaniline,
3-trifluoromethyl-4-chloraniline,
bis-3:5-trifluoromethylaniline,
4-bromaniline,
2:4-dichloraniline,
4-aminobenzenesulfonylamide,
4-aminobenzoic acid methyl ester,
4-butoxyaniline,
4-thiocyananiline,
4-aminoacetophenone,
4-aminophenylacetic acid methyl ester,
3-bromaniline,
4-chloro-3-methylaniline,
4-chloro-2-methylaniline,
3:5-dichloro-4-methylaniline,
4-chloro-3:5-dimethylaniline,
hydroxyaminobenzenes, such, for example, as
4- or 5- or 4:5-dichloro-2-amino-1-hydroxybenzene,
3:4:6-trichloro-2-amino-1-hydroxybenzene,
4- or 5-bromo-2-amino-1-hydroxybenzene,
4:6-dibromo- or
4:6-dichloro-2-amino-1-hydroxybenzene,
4:5-dibromo-2-amino-1-hydroxybenzene,
4-chloro-3-tri-fluoromethyl-2-amino-1-hydroxybenzene.

Or bis-3:5-trifluoromethylaniline is reacted with a phenyl-isocyanate or a phenyl-isothiocyanate, for example with one which contains one or more nitro groups, such as 4-nitrophenyl isocyanate, 3-nitro- or 2-nitro-phenyl-isocyanate, 4-methyl-3-nitrophenyl isocyanate, 4-chloro-3-nitrophenyl isocyanate, 2-nitro-4-chlorophenyl isocyanate, 2-methyl-4-nitro-5-chlorophenyl isocyanate, 2-methoxy-4-nitro-5-chlorophenyl isocyanate or 2:4-dinitro-phenyl isocayanate.

As feedstuffs or feedstuffs additives the mixtures or premixes shown in the following examples may be used:

Example 1

| Feedstuff composition (Premix): | Grams |
|---|---|
| 3:5-bis-trifluoromethyl-4' - nitro-carbanilide or -thiocarbanilide | 2.0 |
| Wheat standard middlings | 7998.0 |
| Total | 8000.0 |

| Mixture to be added: | |
|---|---|
| Maize flour | 1082.9 |
| Fat | 80.0 |
| Fishmeal (60% protein) | 100.0 |
| Soybean meal (50% protein) | 500.0 |
| Maize gluten | 100.0 |
| Lucerne meal | 50.0 |
| Corn distillers' solubles | 40.0 |
| Calcium carbonate | 28.0 |
| Iodized salt | 10.0 |
| Vitamin A and of the D group (1,000,000 units of A and 250,000 units of D per pound) | 4.0 |
| Calcium pantothenate | 0.25 |
| Butyl-hydroxytoluene | 0.25 |
| Choline chloride of 25% strength | 2.5 |
| Riboflavin (24 grams per pound) | 0.1 |
| Vitamin $B_{12}$ (0.02 gram per pound) | 1.0 |
| Methionine | 0.5 |
| Manganese sulfate | 0.5 |
| Total | 2000.0 |

The mixture to be added is prepared as follows: About half of the maize flour is put into the mixer, the remainder, to which the heated, liquefied fat has been added, is then added and the whole is mixed until the fat is evenly distributed. While mixing, the manganese sulfate, calcium carbonate and iodized salt are then added, followed by the fish meal, soy bean meal, lucerne meal and maize gluten and the Corn distillers' solubles. After mixing thoroughly, the vitamins A and D, the calcium pantothenate, choline chloride, riboflavin, vitamin $B_{12}$, methionine and butyl-hydroxy-toluene are added. The thoroughly mixed premix is then added and mixing is continued until all the ingredients are evenly distributed.

Example 2

| Feedstuff additive: | Grams |
|---|---|
| 3:5-bis-trifluoromethyl-4'-nitro - carbanilide or thiocarbanilide | 100 |
| Carbo medicinals | 15 |
| Cerelose to make | 1000 |

The well mixed feedstuffs additive is added to the feed in an amount to give a concentration of about 0.02% of active substance in the uniformly blended mix.

Example 3

| | Mg. |
|---|---|
| 3:6-bis trifluoromethyl-4'-nitro-carbanilide or -thiocarbanilide | 500.0 |
| Starch | 31.0 |
| Colloidal silicic acid | 30.0 |
| Gelatine | 5.0 |
| Arrowroot | 35.0 |
| Magnesium stearate | 4.0 |
| Talc | 20.0 |
| Total | 625.0 |

Grooved tablets are prepared in the conventianal manner with the above ingredients weighing 625 mg.

The 3:5 - bis trifluoromethyl - 4' - nitro-carbanilide used in the above examples may be prepared as follows:

22.9 grams of 3:5-bis-trifluoromethylaniline are dissolved in 100 cc. of acetonitrile, and the resulting solution treated with a solution of 16.5 grams of 4-nitrophenyl isocyanate in 25 cc. of acetonitrile. The temperature rises slowly to 32° C. and is maintained for some hours at 50° C., the 3:5 - bis-trifluoromethyl - 4' - nitro-carbanilide slowly spreading out as a yellow crystalline mass. It melts at 220–225° C., an a second time at 300–305° C.

The following compounds are prepared in an analogous manner:

3:5-bis-trifluoromethyl-3'-nitro-carbanilide, M.P. 230–232° C.,
3:5- bis-trifluoromethyl-3'-nitro-4'-methyl-carbanilide, M.P. 215–217° C.,
3:5-bis-trifluoromethyl-4'-bromo-carbanilide, M.P. 224–225.5° C. (recrystallized from acetonitrile),
3:5-bis-trifluromethyl-4'-chloro-carbanilide, M.P. 214.5–215.5° C. (recrystallized from acetonitrile),
3:5-bis-3trifluoromethyl-3':5'-dichloro-carbanilide, M.P. 219–219.5° C. (recrystallized from acetonitrile),
3:5-bis-trifluoromethyl-4'-fluoro-carbanilide, M.P. 213–214° C. (recrystallized from acetonitrile),
3:5-bis-trifluoromethyl-2':4':5'-trichlorocarbanilide, M.P. 227–228° C. when recrystallized from acetonitrile, solidifies again at 229° C. and sublimes at 270–275° C.,
3:5-bis-trifluoromethyl-4'-n-butoxy-carbanilide, M.P. 195–195.5° C. (recrystallized from acetonitrile),
3:5-bis-trifluoromethyl-3'-chloro-4'-methyl-carbanilide, M.P. 230–231° C. (recrystallized from acetonitrile),
3:3':5-bis-trifluoromethyl-6'-chloro-carbanilide, M.P. 225–226° C. (recrystallized from acetonitrile),
3:5-bis-trifluoromethyl-2'4'-dichloro-carbanilide, M.P. 192–194° C. (recrystallized from acetonitrile),
3:5-bis-trifluoromethyl-2':5'-dichloro-carbanilide, M.P. 225.5–227° C. (recrystallized from acetonitrile),
3:5-bis-trifluoromethyl-3'-chloro-carbanilide, M.P. 175–176° C. (recrystallized from acetonitrile),
3:5-bis-trifluoromethyl-3'-bromo-carbanilide melts at 174–175° C. when recrystallized from nitromethane and washed with chloroform,
3:5-bis-trifluoromethyl-3':4'-dimethyl-carbanilide, M.P. 185.5–186.5° C. (recrystallized from acetonitrile).

The following compounds may be prepared as follows:

(1) 16.2 grams of 3:4-dichloraniline are dissolved in 150 cc. of acetonitrile. A solution of 25.5 grams of bis-3:5-trifluoromethylphenyl isocyanate (B.P. 63° C. under 14 mm. of pressure) in 25 cc. of acetonitrile is added while stirring vigorously. After a short time the condensation product of the formula

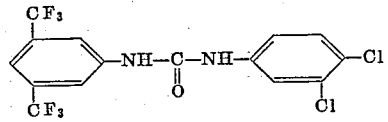

precipitates. Another 25 cc. of acetonitrile are then added, and the reaction mixture stirred for a few hours. 3:5-bis-trifluoromethyl - 3':4' - dichlorocarbanilide is suction-filtered, washed with acetonitrile and dried in vacuo. The crude yield is 36 grams, M.P. 223–224° C.; when recrystallized from acetonitrile the product melts at 227° C.

(2) 19.5 grams of 4-chloro-3-trifluoromethylaniline are dissolved in 150 cc. of acetonitrile; a solution of 25.5 grams of bis-3:5-trifluoromethyl-phenyl isocyanate in 25 cc. of acetonitrile is added while stirring vigorously. Condensation is carried out with gentle heating, no precipitation taking place. By evaporation in vacuo there is obtained tri-3:5':5-trifluoromethyl - 4' - chloro - diphenyl urea in the form of an oil which soon solidifies. The melting point of the crude product is 178–182° C.; after recrystallization from chlorobenzene at 177–178° C. The condensation may also be carried out in chlorobenzene, the urea immediately precipitating as crystals.

(3) 22.9 grams of bis-3:5 - trifluoromethylaniline are dissolved in 100 cc. of acetonitrile; 25.5 grams of bis-3:5-trifluoromethylphenyl isocyanate dissolved in 20 cc. of actonitrile are added while stirring thoroughly. The temperature rises to 32° C., but the solution remains clear. Condensation may also be performed without a solvent, by heating the components directly on a water bath. The product is ground in benzene and suction-filtered. When recrystallized from nitromethane 3:5:3':5' - -tetratrifluoromethyl-carbanilide melts at 253–256° C. The carbanilide is also obtained by boiling 3:5-bis-trifluoromethylphenyl-isocyanate with the calculated quantity of water in acetonitrile.

(4) 19.32 grams of trifluoromethylaniline are dissolved in 150 cc. of acetonitrile; 30.5 grams of bis-3:5-trifluoromethylphenyl isocyanate dissolved in 30 cc. of acetonitrile are then added. After 2 hours the solvent is evaporated in vacuo. The crude product is recrystallized from chlorobenzene and melts at 165–167° C.

(5) 17.75 grams of 3-chloro-4-methoxyaniline (ortho-chloro-para-anisidine) are dissolved in 100 cc. of acetonitrile; 3:5-bis-trifluoromethylphenyl isocyanate is allowed to run into the solution. The reaction mixture warms up to 42° C., 3:5-bis-trifluoromethyl-3'-chloro-4' - methoxy-carbanilide partially precipitating. The condensation product is recrystallized from acetonitrile and melts at 188–190° C.

(6) 22.9 grams of 3:5-bis-trifluoromethylaniline are mixed with 18.9 grams of finely powdered 2-chloro-4-nitrophenyl isocyanate and heated on a water bath, the reaction mixture solidifying with a strong evolution of heat. The condensation product is pulverized, extracted with benzene and the residue dried. The crude yield is 40 grams. With the addition of animal carbon, 3:5-bis-trifluoromethyl-2'-chloro-4'-nitro-carbanilide crystallizes out from acetonitrile in the form of almost colorless, long radiating needles and melts at 211–212° C.

(7) 16.2 grams of 3:4-dichloroaniline are dissolved in a little acetonitrile and added to 27 grams of 3:5-bis-trifluoromethylphenyl isothiocyanate (B.P. 83° C. under 12 mm. of pressure). The reaction mixture heats up within a short time to 82° C.; it is maintained for 1 hour on a boiling water bath and then evaporated in vacuo. The 3:5-bis-trifluoro-methyl-3':4'-dichloro-thiocarbanilide remains behind as a solid mass which is recrystallized from benzene. The melting point of the purified product is 138–139° C. In an analogous manner the following compounds are obtained: 3:5-bis-trifluoromethyl-2':3' - dichlorocarbanilide, M.P. 222.5–223.5° C. (recrystallized from acetonitrile); 3:5-bis-trifluoromethyl-4'-tertiary butyl-carbanilide, M.P. 167–168° C.; 3:5-bis-trifluoromethyl - 4' - thiocyanogen-thiocarbanilide, M.P. 122° C.

(8) 27.1 grams of 3:5-bis-trifluoromethylphenyl thioisocyanate are added to a solution of 19.5 grams of 3-amino-6-chlorobenzotrifluoride in 20 cc. of acetonitrile and kept on a water bath for 1 hour. The reaction mixture becomes slightly discolored and viscous. It is evaporated in vacuo and heated for 2 hours at 90° C. The solid crude product melts at 139–141° C.; it is heated in a little benzene (plus animal carbon) and the filtered warm solution treated with the same volume of cyclohexane, 3:3':5-bis-trifluoromethyl-4' - chlorothiocarbanilide crystallizing out. It melts at 138.5–139° C.

(9) 16.5 grams of para-aminobenzoic acid ethyl ester are dissolved in 100 cc. of acetonitrile and stirred with a solution of 25.5 grams of 3:5-bis-trifluoromethylphenyl isocyanate in 20 cc. of acetonitrile. The condensation product precipitates after a few minutes. It is allowed to stand overnight, then suction-filtered and dried in vacuo at 60° C. The crude yield is 39 grams; the melting point lies at 230–231° C. Recrystallized from about 500 cc. of acetonitrile, 3:5-bis-trifluoromethyl - 4' - carbethoxy - carbanilide melts at 230–231° C.

(10) Bis-3:3':5-trifluoromethyl-thiocarbanilide is prepared according to the method described in (9); the crude product is dissolved with heating in benzene, treated with animal carbon, filtered and the clear solution treated with the same volume of cyclohexane, crystallization setting in;

M.P. 133–134° C. 3:5-bis-trifluoromethyl-4′-bromo-thiocarbanilide is prepared correspondingly; when recrystallized from benzene+cyclohexane it melts at 163–164° C.

(11) A solution of 25.5 grams of 3:5-bis-trifluoromethylphenyl isocyanate in 20 cc. of acetonitrile is added to a solution of 17.1 grams of para-aminophenyl methyl sulfone in 100 cc. of acetonitrile. The temperature is maintained at 65° C. while stirring vigorously, 3:5-bis-trifluoromethyl-4′-methyl-sulfone-carbanilide precipitating in crystalline form overnight. It is recrystallized from acetonitrile and melts then at 224–225.5° C.

(12) 27.1 grams of 3:5-bis-trifluoromethylphenyl isothiocyanate are treated with 22.9 grams of 3:5-bis-trifluoromethylaniline without the addition of any solvent, and heated on a boiling water bath. The reaction mixture solidifies to form a crystalline cake. 3:3′:5:5′-tetra-trifluoromethyl-thiocarbanilide melts at 184.5–186° C. when recrystallized from nitromethane and washed with benzene.

(13) 17.2 grams of sulfanilamide are dissolved in 180 cc. of acetonitrile with gentle heating; a solution of 25.5 grams of 3:5-bis-trifluoromethylphenyl isocyanate in 25 cc. of acetonitrile is added while the reaction mixture is stirred vigorously. The reaction mixture heats up slowly to 45° C. and is maintained at a temperature of 65° C. for 3 hours, 3:5-bis-trifluoromethyl-4′-sulfamidocarbanilide precipitating. Recrystallized from acetonitrile the product melts at 228–230° C.

(14) 3:5-bis-trifluoromethyl-4′-chlorothiocarbanilide is prepared in an analogous manner to the product described in (8). When recrystallized from a mixture of benzene and cyclohexane it melts at 150–151° C.

(15) 17.8 grams of para-dimethylamino-phenyl isothiocyanate and 22.9 grams of 3:5-bis-trifluoromethylaniline are heated together on a boiling water bath for a few hours. The initially liquid reaction mixture becomes solid after some time to form a crystalline mass. The latter is suction-filtered and 3:5-bis-trifluoromethyl-4′-dimethylamino-thiocarbanilide recrystallized from benzene.

(16) 16.5 grams of para-amino-benzoic acid ethyl ester are dissolved in 15 cc. of acetonitrile and treated with 27.1 grams of 3:5-bis-trifluoromethylphenyl isothiocyanate. The temperature rises to 65° C. after a short time; soon afterwards, 3:5-bis-trifluoromethyl-4′-carbethoxy-thiocarbanilide precipitates. The product is dried in vacuo and recrystallized from acetonitrile; M.P. 147.5–148° C.

(17) 21.5 grams of thiocyananiline are dissolved in 100 cc. of acetonitrile and treated, while being stirred vigorously, with 36.5 grams of 3:5-bis-trifluoromethylphenyl isocyanate dissolved in 30 cc. of acetonitrile. The reaction mixture heats up to 50° C. After being inoculated, 3:5-bis-trifluoromethyl-4′-thiocyan-carbanilide precipitates in crystalline form; it is recrystallized from acetonitrile and melts at 204–205° C.

(18) 13.5 grams of para-amino-acetophenone are dissolved in 100 cc. of acetonitrile and treated with a solution of 25.5 grams of 3:5-bis-trifluoromethylphenyl isocyanate in 25 cc. of acetonitrile with vigorous stirring. After a few seconds 3:5-bis-trifluoromethyl-4′-acetocarbanilide precipitates. It is suction-filtered, recrystallized from butanol and washed with acetonitrile. Melting point: 238–239° C.

(19) 11.8 grams of para-aminobenzonitrile are dissolved in 100 cc. of acetonitrile and treated with a solution of 25.5 grams of 3:5-bis-trifluoromethylphenyl isocyanate in 25 cc. of acetonitrile. After some time 3:5-bis-trifluoromethyl-4′-cyancarbanilide precipitates; it is suction-filtered and recrystallized from acetonitrile. Melting point: 252–253° C.

(20) 27.8 grams of meta-methylthioaniline are dissolved in 100 cc. of acetonitrile and treated with 51 grams of 3:5-bis-trifluoromethyl-phenyl isocyanate in acetonitrile. From the reaction mixture heated to 60° C. 3:5-bis-trifluoromethyl-3′-thiomethyl-carbanilide precipitates only slowly; it is then suction-filtered, washed and recrystallized from acetonitrile. Melting point 158–159.5° C.

(21) 3:5-bis-trifluoromethyl-3′-thiomethyl-thiocarbanilide is prepared from 3:5-bis trifluoromethylphenyl isothiocyanate and freshly distilled 3-methylthioaniline. When recrystallized from a mixture of benzene and cyclohexane it melts at 125–127° C.

(22) 3:5-bis-trifluoromethyl-2′:4′:6′-trichlorocarbanilide is obtained by condensing 3:5-bis-trifluoromethylphenyl isocyanate and 2:4:6-trichloraniline in acetonitrile at 60° C. The product melting at 225–227° C. becomes solid again at 229° C. and sublimes at about 295° C.

(23) 21.2 grams of 2-chloro-6-methylaniline are dissolved in 100 cc. of acetonitrile and 38.25 grams of 3:5-bis-trifluoromethylphenyl isocyanate are added dropwise to the solution. 3:5-bis-trifluoromethyl-2′-chloro-6′-methylcarbanilide precipitates immediately. When recrystallized from acetonitrile it melts at 227° C.

(24) 10 grams of 3:5-bis-trifluoromethylaniline are added to a solution of 10 grams of 2-methylsulfonyl-4-nitroaniline in 100 cc. of dimethylformamide and the whole is heated for 2 hours at 50° C., then cooled and 100 cc. of water added. A precipitate settles out which is filtered off. For the purpose of purification the product is recrystallized from a mixture of alcohol and water, to yield 3:5-bis-trifluoromethyl-2′-methylsulfonyl-4′-nitro-carbanilide in the form of crystals meltings at 227–230° C.

(25) 10 grams of 3:5-bis-trifluoromethylphenyl isocyanate are added to a solution of 10 grams of 2-ethylsulfonyl-5-trifluoromethylaniline in 100 cc. of dimethylformamide and the whole is heated for 2 hours at 50° C. On the addition of water a crystalline precipitate settles out which is recrystallized from a mixture of methylenechloride and petroleum ether to yield 3:5-bis-trifluoromethyl-2′-ethylsulfonyl-5′-trifluoromethyl-carbanilide in crystals melting at 173–175° C.

(26) A solution of 10 grams of 2:6-dinitro-4-aminoanisol in 100 cc. of dimethylformamide is treated with 10 grams of 3:5-bis-trifluoromethylphenyl isocyanate and heated for 2 hours at 50° C. The reaction mixture is cooled and 100 cc. of water are added. An oil separates off which crystallizes after being allowed to stand for some time. By recrystallization from a mixture of alcohol and water there is obtained 3:5-bis-trifluoromethyl-3′:5′-dinitro-4-methoxy-carbanilide in the form of crystals melting at 226–228° C.

(27) A solution of 5.0 grams of 4-nitro-aniline and 10.0 g. of 3,5-bis-trifluoromethyl-phenyl isothiocyanate in 50 cc. of acetonitrile is heated for 4 hours at 80° C. After cooling, 100 cc. of water is added at room temperature, whereupon the 3:5-bis-trifluoromethyl-4′-nitro-thiocarbanilide precipitates. After recrystallization from dimethylformamide+water, it melts at 175–177° C.

These compounds can be used for the manufacture of preparations or feedstuffs or feedstuff addition as shown, e.g. in the foregoing examples.

What is claimed is:

1. A feedstuff composition comprising a carbanilide of the formula

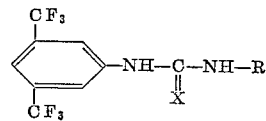

in which R represents phenyl and X stands for a member selected from the group consisting of O and S, and a feedstuff.

2. A feedstuff additive composition comprising about 0.195 to about .0011% of a carbanilide of the formula

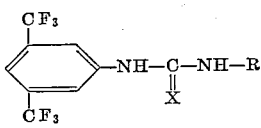

in which R represents phenyl and X stands for a member selected from the group consisting of O and S, and a feedstuff.

3. A feedstuff composition comprising a carbanilide of the formula

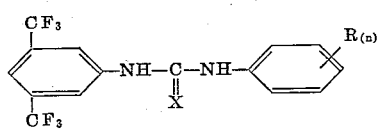

in which R represents a member selected from the group consisting of lower alkyl, lower alkoxy, F, Cl, Br, I, —$CF_3$, —$NO_2$, —CN, —$SO_3H$, —$SO_2NH_2$, —$SO_2CH_3$, —OH, —SCN, —$SO_2NHA$,

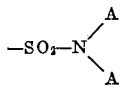

—COOH, —$COCH_3$, —COOA, —$CONH_2$, —CONHA and —$CONA_2$, A representing lower alkyl, $n$ is a whole number from 1 to 4 and X stands for a member selected from the group consisting of O and S, and a feedstuff.

4. A feedstuff additive composition comprising a carbanilide in excess of the therapeutic dosage, said carbanilide being of the formula

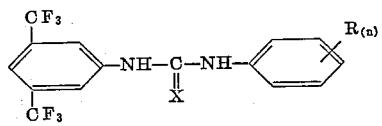

in which R represents a member selected from the group consisting of lower alkyl, lower alkoxy, F, Cl, Br, I, —$CF_3$, —$NO_2$, —CN, —$SO_3H$, —$SO_2NH_2$, —$SO_2CH_3$, —OH, —SCN, —$SO_2NHA$,

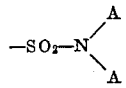

—COOH, —$COCH_3$, —COOA, —$CONH_2$, —CONHA and —$CONA_2$, A representing lower alkyl, $n$ is a whole number from 1 to 4 and X stands for a member selected from the group consisting of O and S, and a feedstuff.

5. A feedstuff composition comprising a compound of the formula

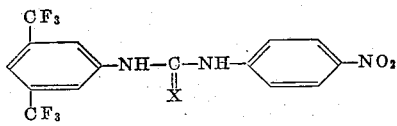

wherein X stands for a member selected from the group consisting of O and S, and a feedstuff.

6. A feedstuff additive composition comprising a compound of the formula

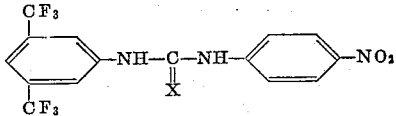

wherein X stands for a member selected from the group consisting of O and S, and a feedstuff, said compound being in an amount greater than the therapeutically effective amount.

7. A process for effecting enhanced growth and well-being which comprises administering orally to an animal a composition as claimed in claim 1.

8. A process for effecting enhanced growth and well-being which comprises administering orally to an animal a composition as claimed in claim 3.

9. A process for effecting enhanced growth and well-being, which comprises administering orally to an animal a composition as claimed in claim 5.

10. A feedstuff composition as claimed in claim 1, wherein the content of carbanilide compound is between 0.1 and 0.001%.

11. A feedstuff composition as claimed in claim 3, wherein the content of carbanilide compound is between 0.1 and 0.001%.

12. A feedstuff composition as claimed in claim 5, wherein the content of carbanilide compound is between 0.1 and 0.001%.

13. A process for effecting enhanced growth and well-being which comprises orally administering to an animal a composition as claimed in claim 10.

14. A process for effecting enhanced growth and well-being which comprises orally administering to an animal a composition as claimed in claim 11.

15. A process for effecting enhanced growth and well-being which comprises orally administering to an animal a composition as claimed in claim 12.

References Cited

UNITED STATES PATENTS

| | | | |
|---|---|---|---|
| 2,745,874 | 5/1956 | Schetty | 167—30 |
| 2,983,646 | 5/1961 | Ruhoff | 167—55 |
| 3,073,861 | 1/1963 | Raasch | 167—55 |
| 3,230,141 | 1/1966 | Frick | 167—38.6 |

SAM ROSEN, *Primary Examiner.*

JULIUS S. LEVITT, *Assistant Examiner.*